United States Patent [19]
Wei et al.

[11] Patent Number: 5,631,201
[45] Date of Patent: May 20, 1997

[54] TRANSLUCENT POLYCRYSTALLINE ALUMINA AND METHOD OF MAKING SAME

[75] Inventors: George Wei, Weston; Arlene Hecker, Beverly; David Goodman, Amesbury, all of Mass.

[73] Assignee: Osram Sylvania Inc., Danvers, Mass.

[21] Appl. No.: 681,566

[22] Filed: Jul. 29, 1996

[51] Int. Cl.[6] .......................... H01J 61/30; H01J 17/18; C04B 35/115

[52] U.S. Cl. .......................... 501/152; 501/153; 313/493; 313/636

[58] Field of Search .................... 501/121, 126, 501/127, 152, 153; 313/493, 636

[56] References Cited

U.S. PATENT DOCUMENTS

| | | | |
|---|---|---|---|
| 3,026,210 | 3/1962 | Coble | 501/153 |
| 3,377,176 | 4/1968 | Wolkodoff et al. | 501/153 |
| 3,843,915 | 10/1974 | Cleveland et al. | 501/153 |
| 3,905,845 | 9/1975 | Kobayashi et al. | 501/153 |
| 4,031,177 | 6/1977 | Auriol et al. | 501/153 |
| 4,285,732 | 8/1981 | Charles et al. | 501/101 |
| 4,762,655 | 8/1988 | Rhodes et al. | 501/153 |
| 5,106,788 | 4/1992 | Suzuki et al. | 501/87 |
| 5,426,343 | 6/1995 | Rhodes et al. | 313/623 |
| 5,587,346 | 12/1996 | Zuk | 501/152 |

FOREIGN PATENT DOCUMENTS 119959  12/1993  European Pat. Off. .

*Primary Examiner*—Mark L. Bell
*Assistant Examiner*—David Sample
*Attorney, Agent, or Firm*—William H. McNeill

[57] ABSTRACT

An optically translucent polycrystalline alumina sintered body consists essentially of alumina, magnesia, terbia and, optionally, yttria. The magnesia is present in an amount of about 0.020 wgt. percent and the terbia is present in an amount of from about 0.005 to 0.060 wgt. percent. The yttria is present in an amount up to about 0.035 wgt. percent.

4 Claims, 3 Drawing Sheets

TRANSLUCENT POLYCRYSTALLINE ALUMINA AND METHOD OF MAKING SAME

TECHNICAL FIELD

This invention relates to translucent ceramics and more particularly to a high density polycrystalline alumina (PCA) which, when formed into arc tubes for high pressure sodium lamps, shows increased resistance to sodium loss with a concomitant decrease in outer envelope darkening, together with higher efficacy derived from operation at higher wall temperatures.

BACKGROUND ART

Translucent bodies of PCA are known. Coble, in U.S. Pat. No. 3,026,210 discloses the use of 0.0625 to 0.5 wgt. percent MgO to aid in the elimination of residual porosity by preventing the entrapment of pores inside alumina grains and to control grain growth in the late stages of sintering, when the density exceeds 98%.

Charles, et al., in U.S. Pat. No. 4,285,732, suggests the addition of small amounts of zirconia and/or hafnia to the alumina-magnesia ceramic to control the formation of a second phase, usually, spinel; i.e., magnesium aluminate, $MgAl_2O_4$, which can occur when the magnesia content increases above the solubility level. Grain sizes in the sintered bodies are said to be 20 microns to 50 microns. The range of dopants included 0.030–0.150 wgt. percent magnesia and 0.002–0.070 wgt. percent zirconia and/or hafnia.

U.S. Pat. No. 3,377,176 discloses an alumina composition employed in arc tubes and utilizing 0.05 wgt. percent magnesia and 0.035 wgt. percent yttria.

Maekawa et al., in European Pat. Application No. 93-119959.0, disclose a triple doped alumina including 0.010–0.080 wgt. percent magnesia, 0.001–0.030 wgt. percent yttria, and 0.020–0.120 wgt. percent zirconia.

DISCLOSURE OF INVENTION

It is, therefore, an object of the invention to enhance the manufacture of translucent ceramics.

It is another object of the invention to produce translucent ceramics having a small grain size with optimal density.

Yet another object of the invention is provision of an arc tube for a high pressure sodium lamp having increased efficacy and improved lumen maintenance.

These objects are accomplished, in one aspect of the invention, by the provision of an optically translucent polycrystalline body consisting essentially of magnesia, terbia and, optionally, yttria, with the magnesia being present in an amount of about 0.02 wgt. percent and the terbia being present in an amount effective to substantially form a terbium aluminate second phase during arc tube manufacture.

In an embodiment of the invention, the optically translucent polycrystalline alumina sintered body consists essentially of about 0.020 to 0.050 wgt. percent magnesia, about 0.005 to about 0.060 terbia, up to about 0.035 wgt. percent yttria and the balance alumina.

In a preferred embodiment of the invention, the alumina body consists essentially of 0.02 wgt. percent magnesia, 0.02 wgt. percent terbia and 0.02 wgt. percent yttria.

A method of making such a translucent ceramic article comprises the steps of: forming an aqueous slurry to yield the composition described above. To that composition is added nitric acid to adjust the pH to 4.6. An aqueous binder and plasticizer in the amount of 2.5 solids wgt. percent are then added to the slurry which is then spray-dried. An article is formed by wet-bag isopressing and the article is prefired in air at about 1325° C. for about 2 hours; and then is sintered in hydrogen for about 3 hours at about 1830° C.

BEST MODE FOR CARRYING OUT THE INVENTION

Figure 1:
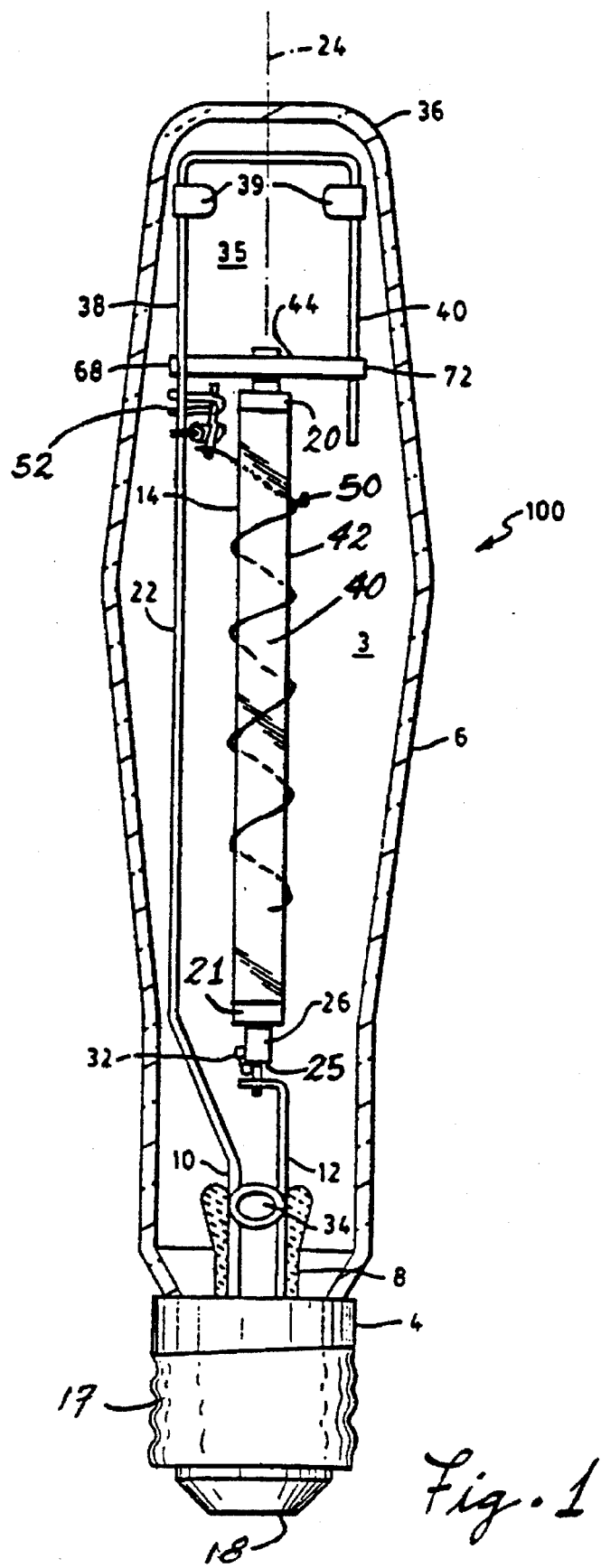
FIG. 1 is a front elevational view of a high pressure sodium lamp which can utilize the invention.

For a better understanding of the present invention, together with other and further objects, advantages and capabilities thereof, reference is made to the following disclosure and appended taken in conjunction with the above-described drawings.

Referring now to the drawing with greater particularity, there is shown a high pressure sodium vapor lamp 100 having a vitreous outer envelope 6 with a standard mogul screw base 4 attached to the stem end which is shown lowermost in the figure. A reentrant stem press 8 has a pair of relatively heavy lead-in conductors 10 and 12 extending through the stem 8 and having outer ends of conductors 10 and 12 connected to the screw shell 17 and eyelet 18.

The lamp 100 has an inner envelope or arc tube 14 centrally located within the outer envelope 6. The arc tube 14 is comprised of a length of light transmitting ceramic formed of polycrystalline alumina ceramic which is translucent. The arc tube 14 contains a charge of vaporizable metal which may include the addition of a metal buffer gas such a mercury with an operating range of 0.1 to 5 atmospheres and having an emitting species of sodium at a typical operating pressure of 60 Torr or higher. The upper end of the arc tube 14 is closed by an alumina ceramic plug 20 through which a niobium in-lead 26 projects and which supports an upper electrode (not shown) within the are tube 14. The lower end of arc tube 14 has a closure which comprises a ceramic plug 21 through which extends a thin-walled niobium tube 26. The niobium tube 26 serves as an in-lead for arc tube 14. The shank of the lower electrode (not shown) of arc tube 14 projects into tube 26 and is locked in place by crimping the tube 26 about the lower electrode at location 25. The lamp has a tungsten wire 50 coiled around the arc tube 14. The wire 50 is connected to one of the electrodes by a thermal switch 52 and is placed betwee the electrodes where the lowest breakdown voltage is achieved. The thermal switch opens when the lamp is warm.

The arc tube 14 is of primary interest to the invention and has an arc chamber 40 defined by walls 42. The arc tube comprises magnesia in an amount of about 0.020 to 0.050 wgt. percent; terbium oxide; and up to 0.035 wgt. percent yttria; balance alpha alumina, the terbium oxide being present in an effective amount to substantially form a terbium aluminate second phase during lamp manufacture.

The inclusion of terbia has been shown to cause the formation of terbium aluminate during lamp operation and processing, which formation has been shown to decrease sodium loss while allowing increased wall temperatures. It is known that high pressure sodium lamps can gain 2–3% in lumen output with each 50° C.increase in wall temperature.

The following non-limiting examples illustrate the invention.

EXAMPLE 1

A batch alumina powder containing, in wgt. percent, 0.02% MgO; 0.04% $Tb_2O_3$; and 2.5% organic binder and plasticizer, such as 2.0 wgt. % polyethylene glycol and 0.5% wgt. % polyvinyl alcohol, was prepared by dispersing 500 g of 0.3 μm 65% alpha and 35% gamma alumina at 40% solids in water in which had been added quantitatively analyzed aqueous solutions of $Mg(NO_3)_2$ and $Tb(NO_3)_3$. The terbium nitrate was purchased from Alfa Aesar and was 99.99% pure on a metals basis. Nitric acid was added to adjust the pH to 4.6. Aqueous binder such as polyvinyl alcohol and a plasticizer such as polyethylene glycol were added in the amount of 2.5 solids wgt. percent. The slurry was stirred and then spray-dried, and the resultant power was formed into articles by wet-bag isopressing. The article was pre-fired in air for 2 hours at 1325° C., followed by sintering in dry nitrogen-8% hydrogen for 30 minutes at 1900° C. in a belt furnace, or in hydrogen for about 3 hours at about 1830° C.

EXAMPLE 2

The identical procedure as Example 1 was followed except that the amount of MgO was 0.05 wgt. percent.

EXAMPLE 3

The identical procedure as Example 1 was followed except that the amount of $Tb_2O_3$ was 0.06 wgt. percent.

EXAMPLE 4

The identical procedure as Example 1 was followed except that composition included 0.002 wgt. percent $Y_2O_3$.

EXAMPLE 5

The identical procedure as Example 1 was followed except that the amount of $Tb_2O_3$ was 0.02 wgt. percent and the composition included 0.02 wgt. percent $Y_2O_3$.

EXAMPLE 6

The identical procedure as Example 1 was followed except that the amount of $Tb_2O_3$ was 0.04 wgt. percent, the amount of MgO was 0.02 wgt. percent and the amount of $Y_2O_3$ was 0.02 wgt. percent.

EXAMPLE 7

The identical procedure as Example 1 was followed except that the amount of $Tb_2O_3$ was 0.06 wgt. percent, the amount of MgO was 0.02 wgt. percent and the amount of $Y_2O_3$ was 0.02 wgt. percent.

In all instances, the sintered articles produced were discharge vessels suitable for use in high pressure sodium lamps. The discharge vessels were designed for 200 W lamp operation; built into lamps and force tested by operation at 400 W. This test increases sodium reaction, allowing lamps to experience more reactions in 2000 hours than what normal lamps experience in 24,000 hours.

The results of lamps aged 2000 to 2500 hours (except for the control, which was aged to 1000 hours) are shown in Table 1.

TABLE I

| TEST | INITIAL ARC TUBE TRANSMISSION (%) | | | | |
|---|---|---|---|---|---|
| | Total | In-line | KLUMENS | % T | WATTS |
| Ex. 1 | 96.4 | 5.2 | 30.2 | 39.4 | 383 |
| Ex. 2 | 96.5 | 4.8 | 35.0 | 54.9 | 378 |
| Ex. 3 | 96.8 | 5.4 | 39.9 | 63.1 | 366 |
| Ex. 4 | 96.5 | 4.6 | 39.7 | 64.2 | 369 |
| Ex. 5 | 97.0 | 6.1 | 37.3 | 55.8 | 380 |
| Ex. 6 | 96.7 | 6.2 | 33.4 | 42.5 | 391 |
| Ex. 7 | 96.8 | 5.5 | 31.0 | 38.5 | 393 |
| Control | 96.4 | 6.0 | 32.1 | 35.3 | 378 |

In the Table, KLUMENS represents thousands of lumens and %T represents the percent transmission of the outer jacket. The control was represented by a standard capsule having as additives 0.05 wgt. percent MgO and 0.035 wgt. percent $Y_2O_3$.

Figure 2A:
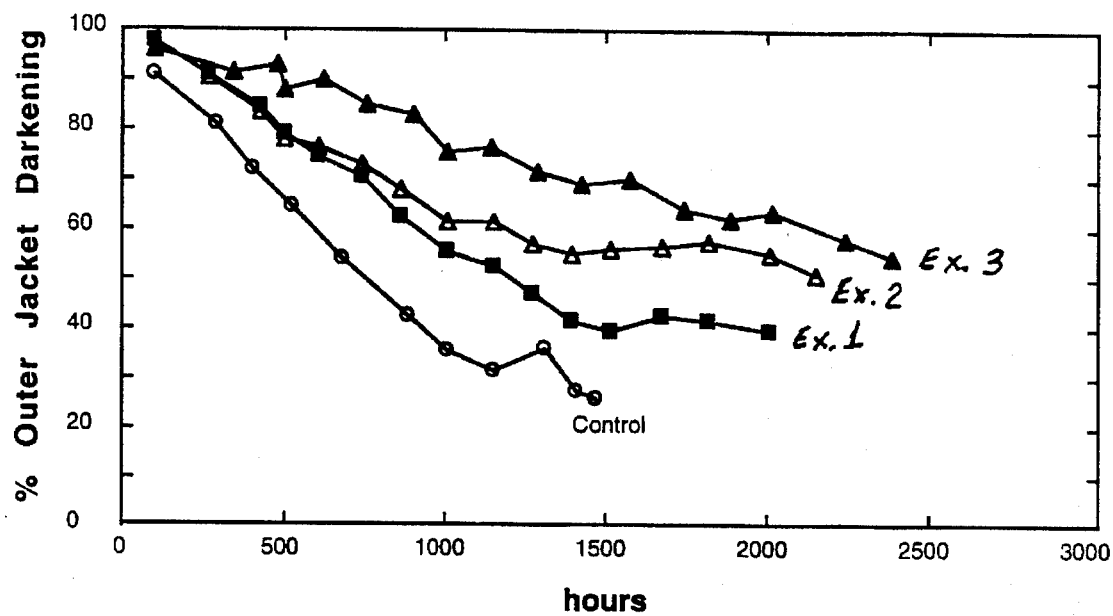
FIGS. 2a and 2b are graphs of seven examples of the invention relative to a control, plotting outer jacket darkening vs. time.
Figure 2B:
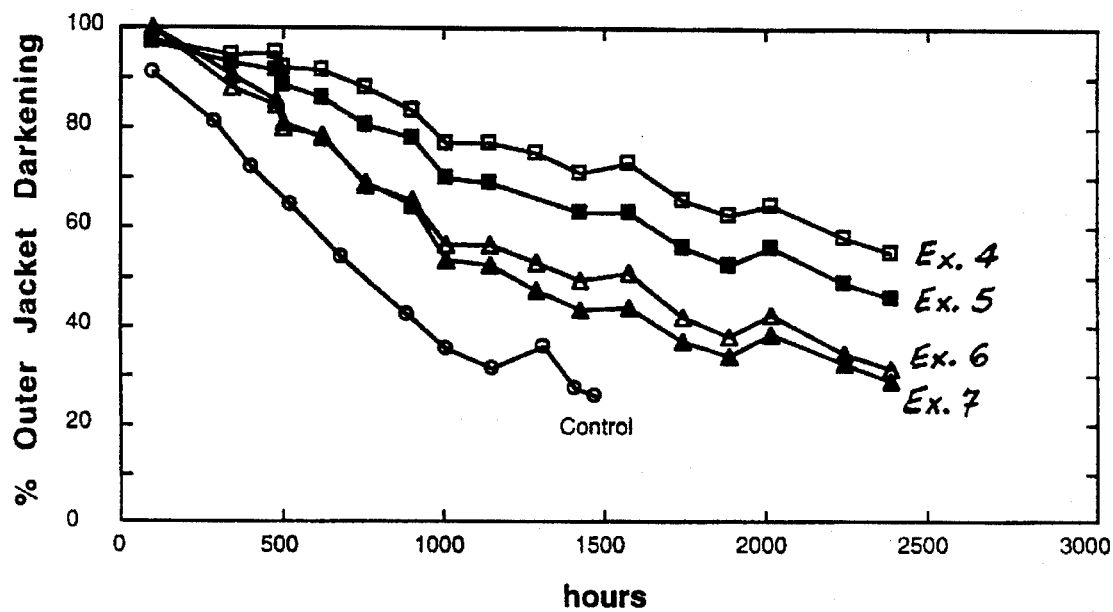
Figure 3A:
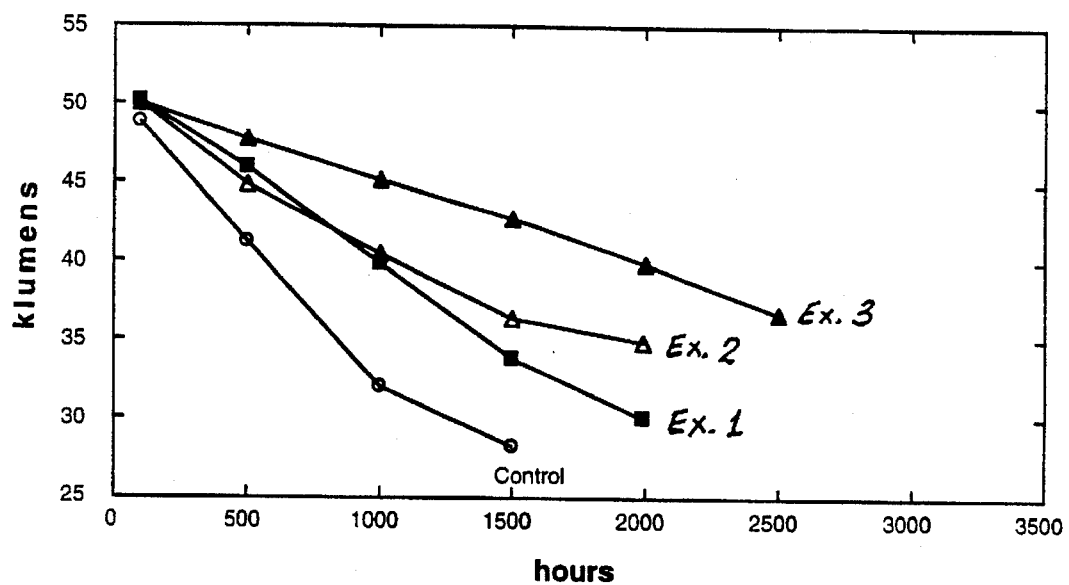
FIGS. 3a and 3b are graphs of the same seven examples of the invention relative to the same control, plotting thousands of lumens output vs. time.
Figure 3B:
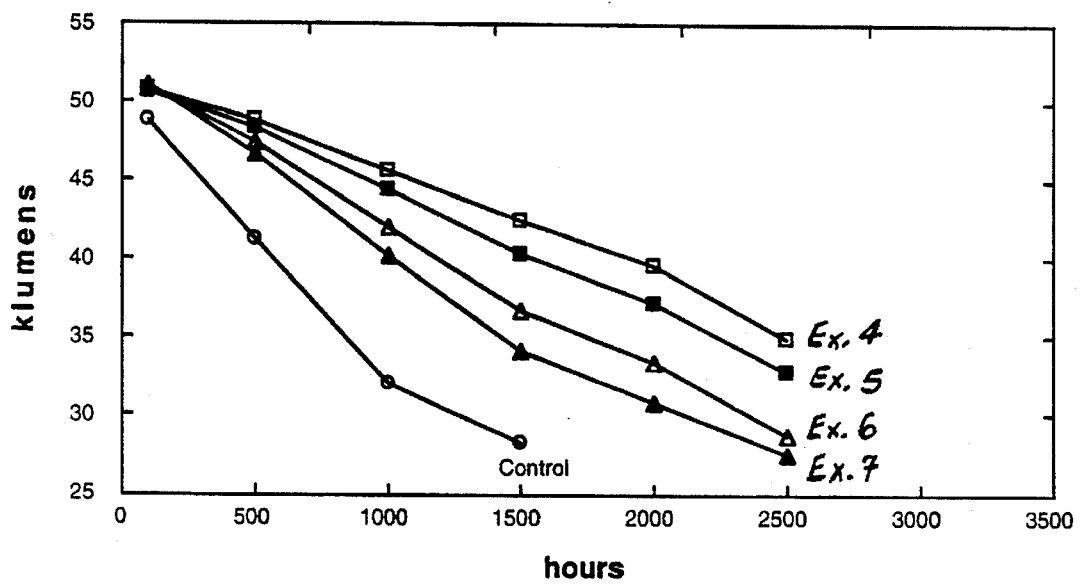

The data of lumens vs. time and outer jacket darkening vs. time are plotted in FIGS. 2 and 3. The plots make abundantly clear the superiority of the inventive compositions relative to the prior art compositions.

Thus, the composition herein described produces translucent ceramic articles having a greater resistance to sodium reactions than compositions currently employed.

While there have been shown and described what are at present considered the preferred embodiments of the invention, it will be apparent to those skilled in the art that various changes and modifications can be made herein without departing from the scope of the invention as defined by the appended claims.

What is claimed is:

1. An arc tube for a high pressure sodium lamp, said arc tube consisting essentially of: magnesia in an amount of about 0.020 to 0.050 wgt. percent; terbium oxide; and up to about 0.035 wgt. percent yttria; balance alumina, the terbium oxide being present in an effective amount of about 0.005 to about 0.060 to substantially cause the formation of terbium aluminate second phase during lamp manufacture.

2. The arc tube of claim 1 wherein said composition includes about 0.035 wgt. percent yttria.

3. The arc tube of claim 2 wherein said composition includes 0.020 wgt. percent terbia and 0.020 wgt. percent yttria.

4. An optically translucent polycrystalline alumina sintered body consisting essentially of alumina, magnesia, terbia and, optionally, yttria, said magnesia being present in an amount of about 0.020 to 0.050 wgt. percent; said terbia being present in an amount of from about 0.005 to about 0.060; and said yttria being present in an amount up to about 0.035 wgt. percent.

* * * * *